United States Patent [19]

Decrouez

[11] Patent Number: 5,701,332
[45] Date of Patent: Dec. 23, 1997

[54] DETECTOR OF THE PRESENCE OF A SEQUENCE OF FSK MODULATED SIGNALS ARRIVING ON A MODEM

[75] Inventor: Christelle Decrouez, Brignoud, France

[73] Assignee: SGS-Thomson Microelectronics S.A., Saint Genis, France

[21] Appl. No.: 526,511

[22] Filed: Sep. 11, 1995

[30] Foreign Application Priority Data

Sep. 14, 1994 [FR] France ............................ 94 11213

[51] Int. Cl.⁶ .......................... H04L 27/14; H04L 5/16
[52] U.S. Cl. .......................... 375/334; 375/222
[58] Field of Search .......................... 375/272, 222, 375/331, 341, 358, 368, 334; 329/300; 358/434, 435; 379/93, 97

[56] References Cited

U.S. PATENT DOCUMENTS

| 3,836,726 | 9/1974 | Wells et al. ............................ 379/57 |
| 3,890,461 | 6/1975 | Vogelman et al. ...................... 348/4 |
| 5,309,476 | 5/1994 | Murray et al. .......................... 375/8 |
| 5,337,332 | 8/1994 | Yaguchi et al. ......................... 375/94 |

*Primary Examiner*—Tesfaldet Bocure
*Attorney, Agent, or Firm*—Wolf, Greenfield & Sacks, P.C.; James H. Morris

[57] ABSTRACT

A detector of the presence of a sequence of signals modulated by frequency shift keying arriving at a modem, which includes two notch filters each of them receiving the modulated signal and two energy calculation circuits respectively associated with each notch filter, each notch filter having a cut-off frequency corresponding to one of the frequencies of the frequency shift keying.

33 Claims, 1 Drawing Sheet

DETECTOR OF THE PRESENCE OF A SEQUENCE OF FSK MODULATED SIGNALS ARRIVING ON A MODEM

BACKGROUND OF THE INVENTION

1. Field of the Invention

The present invention relates to the field of digital modulators/demodulators (modems) and more specifically to detecting the reception of a sequence of signals modulated by frequency shift keying in a modem. The invention more specifically applies to the detection of a determined sequence of signals modulated by frequency shift keying in modems used for the transmission of faxes.

2. Discussion of the Related Art

Such modems function in two-way alternate mode (half-duplex) and are likely to transmit and receive signals corresponding to two types of modulations. A phase and amplitude modulation (QAM) of a carrier is used for transmitting the data. The data to be transmitted is digitally coded from a number of symbols, then transmitted in the form of samples of portions of a carrier modulated, for example, in phase and amplitude. An FSK modulation is used to exchange information as to the communication, especially to acknowledge the reception of each page transmitted by fax. The frequency shift keying, currently called FSK modulation, consists of transmitting on a transmission line a frequency F0 corresponding to a 0 binary state and a frequency F1 corresponding to a 1 binary state. Accordingly, the switching from a QAM modulation to FSK modulation must happen at the end of each page of the document transmitted by fax. The switching is triggered by the modem receiver on the basis of a detection of an end of data transmission which puts the modem in FSK modulation. On the transmit side, the switching is performed by a detection of the reception of a determined sequence of FSK modulated signals transmitted by the modem receiver of the document transmitted by fax.

The sequence of signals is transmitted in channel 2 standard V21 and is fixed by the users. Generally, the detection of the signal sequence 01111110 is provided. According to channel 2 standard V21, the speed is 300 bits/s and frequencies F0 and F1 are respectively 1850 Hz and 1650 Hz. Transmitting a 01111110 sequence amounts to repeatedly transmitting a signal with frequency F0 for 3.3 ms, then a signal with frequency F1 for 6 times 3.3 ms, and then again a signal with frequency F0 for 3.3 ms.

A modem which receives this sequence of signals, on the document transmit side, must be able to recognize it so as to switch itself to FSK modulation. Various methods have already been proposed to achieve the detection.

A first method consists of using a conventional FSK demodulator and identifying the sequence of demodulated signals. Such a solution has the drawback of continuously performing FSK demodulation of the signals received by the modem, and this even occurs in the case of QAM modulated signals. This method entails the permanent monopolizing of the computing time, which slows the transmission rate of QAM modulated data. In addition, the implementation of a particular FSK demodulator leads to a complex structure.

A second method consists in using a band-pass filter centered on frequency F1 receiving the modulated signal. The energy level at the output of the filter is compared with a predetermined threshold value in order to allow a state machine to determine that the sequence has been received if the output level of the filter is at a certain level for a certain period. A drawback of such a solution is that it provokes detection errors, since such an energy level can appear in sequences of QAM modulated signals.

A variant of this second method consists in using two band-pass filters respectively centered on frequencies F0 and F1, and to compare the energy levels of the filter outputs so as to detect the presence of an FSK modulated signal. Though it provides a better detection with respect to the second method, this solution still does not allow reliable detection of the presence of an FSK modulation. There can still be errors in presence of a QAM modulated signal, or of noise on the transmission line.

Another drawback of the two variants of the second method is the response time of the filters, which is too long to allow a correct detection of the occurrence of the predetermined sequence. Typically, a digital band-pass filter conventionally is a recursive, at least second order, filter, constituted by integrators, multipliers, and delay elements (shift registers). The structure and the behavior of a filter of this type have been discussed by P. M. BEAUFILS and M. RAMI in "Le filtrage numérique", pages 216 to 224. A drawback of this type of filter is that obtaining a narrow band-pass filter, which is necessary for avoiding false detections, leads to a slow filter.

The same response time problem is found again in the energy calculator which calculates the energy level of the filter output. Indeed, such calculation circuits are generally constituted by a circuit for determining the absolute value and by a low-pass recursive first order digital filter with a zero cut-off frequency.

The two time constants, when added (band-pass filter and energy calculation circuit) are too long to comply with the delay constraint fixed by the standard. Conversely, complying with this constraint provokes detection errors by widening the transmission band of the filters.

SUMMARY OF THE INVENTION

An object of the invention is to overcome these drawbacks with a detector of a sequence of frequency shift keying modulated signals which is fast, reliable and has a simple design.

An embodiment of the present invention provides a detector of a sequence of signals modulated in frequency shift keying arriving at a modem, which includes a first notch filter and a second notch filter, each receiving the modulated signal, and a first energy calculation circuit associated with the first notch filter and a second energy calculation circuit associated with the second notch filter, each notch filter having a cut-off frequency corresponding to one of the frequencies of frequency shift keying modulation.

According to another embodiment of the invention, the detector further includes a comparator, each input of which receives an output of one of the energy calculation circuits, and which issues as an output a two-state signal indicating the presence of one of the modulation frequencies in the input signal.

According to a further embodiment of the invention, the detector is associated with a modem and means for recognizing a determined signal sequence previously stored by the modem.

According to an embodiment of the invention, each notch filter is a non-recursive digital filter.

According to an embodiment of the invention, each notch filter is a second order filter with one zero.

According to an embodiment of the invention, the cut-off frequencies of the notch filters are respectively 1850 Hz and 1650 Hz.

According to another embodiment of the invention, an apparatus for detecting at least one signal at one of a first frequency and a second frequency in an input signal is provided. The apparatus comprises a first notch filter with an input that receives the input signal and an output that provides a first filtered signal that is substantially equal to the input signal with a first attenuated portion corresponding to the first frequency, and a first energy determination circuit with an input coupled to the output of the first notch filter and an output that provides a first energy signal that corresponds to an energy value of the first filtered signal. The apparatus also comprises a second notch filter with an input that receives the input signal and an output that provides a second filtered signal substantially equaling the input signal with a second attenuated portion corresponding to the second frequency, and a second energy determination circuit with an input coupled to the output of the second notch filter and an output that provides a second energy signal that corresponds to an energy value of the second filtered signal. Additionally, the apparatus comprises a comparator with a first input coupled to the output of the first energy determination circuit, a second input coupled to the output of the second energy determination circuit, and an output that provides an output signal based on a comparison of the first energy signal and the second energy signal. The output signal has a first state when the first energy signal is greater than the second energy signal and has a second state when the first energy signal is less than the second energy signal.

According to a further embodiment of the invention, a modem with an input is provided. The modem includes a circuit with an input coupled to the input of the modem, that detects at least one signal at one of a first frequency and a second frequency in an input signal arriving at the input of the modem, is provided. The circuit includes a first notch filter with an input that receives the input signal and an output that provides a first filtered signal substantially equaling the input signal with a first attenuated portion corresponding to the first frequency, and a first energy determination circuit with an input coupled to the output of the first notch filter and an output that provides a first energy signal that corresponds to an energy value of the first filtered signal. The circuit also includes a second notch filter with an input that receives the input signal and an output that provides a second filtered signal substantially equaling the input signal with a second attenuated portion corresponding to the second predetermined frequency, and a second energy determination circuit with an input coupled to the output of the second notch filter and an output that provides a second energy signal that corresponds to an energy value of the second filtered signal. Additionally, the circuit includes a comparator with a first input coupled to the output of the second energy determination circuit, and an output that provides an output signal based on a comparison of the first energy signal and the second energy signal. The output signal has a first state when the first energy signal and the second energy signal. The output signal has a first state when the first energy signal is greater than the second energy signal and has a second state when the first energy signal is less than the second energy signal.

According to another embodiment of the present invention, a facsimile machine with an input is provided. The facsimile machine includes a circuit with an input coupled to the input of the facsimile machine, that detects at least one signal at one of a first frequency and a second frequency in an input signal arriving at the input of the facsimile machine, is provided. The circuit includes a first notch filter with an input that receives the input signal and an output that provides a first filtered signal substantially equaling the input signal with a first attenuated portion corresponding to the first frequency, and a first energy determination circuit with an input coupled to the output of the first notch filter and an output that provides a first energy signal that corresponds to an energy value of the first filtered signal. The circuit also includes a second notch filter with an input that receives the input signal and an output that provides a second filtered signal substantially equaling the input signal with a second attenuated portion corresponding to the second predetermined frequency, and a second energy determination circuit with an input coupled to the output of the second notch filter and an output that provides a second energy signal that corresponds to an energy value of the second filtered signal. Additionally, the circuit includes a comparator with a first input coupled to the output of the first energy determination circuit, a second input coupled to the output of the second energy determination circuit, and an output that provides an output signal based on a comparison of the first energy signal and the second energy signal. The output signal has a first state when the first energy signal is greater than the second energy signal and has a second state when the first energy signal is less than the second energy signal.

According to a further embodiment of the invention, a method for identifying a predetermined sequence of signals from an input signal is provided. The predetermined sequence of signals includes at least one first signal at a first frequency and at least one second signal at a second frequency. The method comprises the four steps. One step is comprised of filtering the input signal to produce a first filtered signal substantially equal to the input signal with a first attenuated portion corresponding to the first predetermined frequency. Another step comprises filtering the input signal to produce a second filtered signal substantially equal to the input signal with a second attenuated portion corresponding to the second predetermined frequency. A further step comprises comparing a first energy value of the first filtered signal to a second energy value of the second filtered signal to provide an output signal having a first state when the first energy value is greater than the second energy value and having a second state when the first energy value is less than the second energy value. Another step comprises indicating that the sequence of signals is the predetermined sequence of signals, when the output signal provided is a predetermined sequence of first and second states.

The foregoing and other objects and advantages will be more fully appreciated from the following drawing:

DETAILED DESCRIPTION

Figure 1:
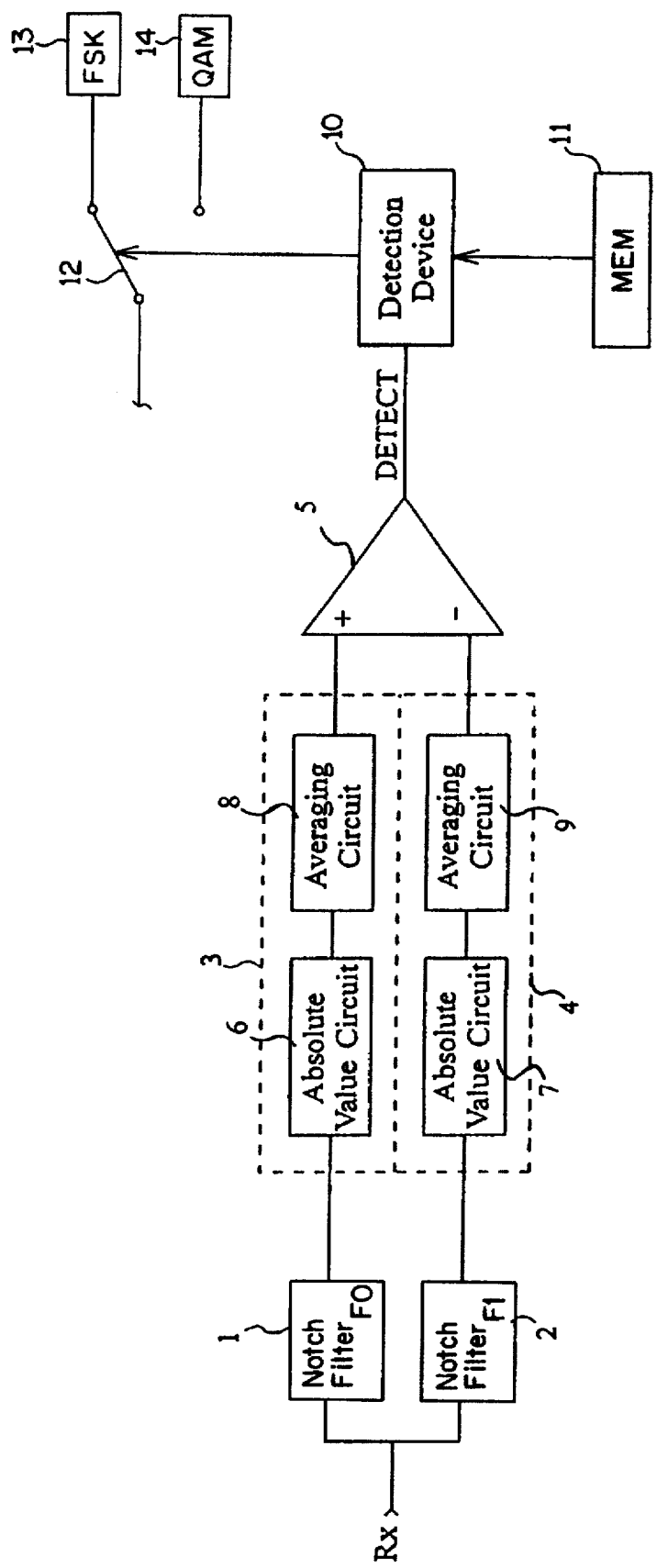
FIG. 1 shows an embodiment of a detector of a sequence of FSK modulated signals according to the invention.

Referring to FIG. 1, the detector according to an embodiment of the invention includes two notch filters 1 and 2 on which the receive signal Rx is sent by the modem after being digitized. The output of each notch filter 1 or 2 is sent to an energy calculation circuit, respectively 3 and 4, having its output connected to an input of a comparator 5.

Each energy calculation circuit 3 or 4 is conventionally constituted by a circuit for determining the absolute value, and by a recursive first-order digital low-pass filter with a zero cut-off frequency that functions as an averaging circuit.

Each notch filter 1 or 2 has a cut-off frequency which corresponds to one of frequencies F0 or F1 of the FSK modulation, that is, for the V21 standard, respectively 1850 Hz and 1650 Hz.

In an embodiment, the output of comparator 5 issues a DETECT signal indicating the presence of an FSK modulated signal. The output of comparator 5 can be in one of two states (HIGH, LOW) according to whether the level of the first input is higher than the level of the second input (HIGH), or conversely (LOW).

Accordingly, when the determined sequence, for example 01111110, occurs, the output DETECT signal of comparator 5 will reproduce the sequence, if the HIGH state is taken to correspond to a 1 and the LOW state to a 0.

In the presence of a QAM modulation, or only of noise, the input levels of comparator 5 will be essentially the same and the DETECT output signal will sometimes randomly be in its HIGH state and sometimes in its LOW state.

Therefore, an advantage of this embodiment is that noise likely to be added to the receive signal Rx is not a problem, since its contribution is the same on the energy levels of the two inputs of comparator 5. Further continuous examination of the receive signal by the detector according to the invention is not a nuisance, since it does not require calculations which would be likely to slow the data transmission rate.

An additional advantage of the use of such notch filters 1 and 2 is that they are easily implementable in the form of digital non-recursive filters having a low time constant. This is not the case for a band-pass filter, since a non-recursive filter includes only zeros (frequencies for which the attenuation is infinite). The cell number of the band pass filter should thus be multiplied in order to surround the central frequency with a great number of zeros (cut-off frequencies), since it is desired to obtain a determined non-cut frequency, which would lead to a very high propagation delay of the signal in the filter. Conversely, for a notch filter, the determined frequency is precisely a cut-off frequency, and hence, a zero.

By means of such a device, the presence of an FSK modulated signal can be quickly and reliably detected. This allows the modem transmitter of the document to switch, via switch 12 from QAM modulation 14, to FSK modulation 13.

The identification of the predetermined sequence can be performed in a conventional manner once the modem has switched to FSK modulation, which then requires no calculation time during transmission periods of QAM modulation.

If, nevertheless, it is desired to identify a determined sequence of FSK modulated signals, for example 01111110, before the switching, via switch 12, of the modem to FSK modulation 13, one only has to compare, via detection device 10, the output DETECT signal of comparator 5 with respect to a sequence stored in memory MEM 11 by the modem.

The time constant of the detector according to the invention corresponds to the time constant of notch filters 1 and 2 added to the time constant of energy calculation circuits 3 and 4. It can be assumed that only the time constant of energy calculation circuits 3 and 4 (that of their averaging circuits) is significant in order to comply with the constraints imposed by the standard on the detection delay, the time constant of notch filters 1 and 2 being negligible compared to the latter. As an example, a non-recursive second order notch filter allows for good accuracy, while complying with the constraints of the V21 standard.

The present invention has various alterations and modifications which will readily occur to one skilled in the art.

For example, each of the described components can be replaced by one or several elements performing the same function. Furthermore, although the foregoing description includes an analog embodiment of the invention, it should be clear to one skilled in the art that each element of the present invention can be replaced with corresponding digital elements or software implementations. Additionally, although the foregoing description included a fax modem, the invention may be included as part of any type of modem, or as part of any device where detecting a sequence of frequency shift keyed modulated signals is desired.

Having thus described at least one illustrative embodiment of the invention, various alterations, modifications and improvements will readily occur to one skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A detector of a frequency shift keyed modulated sequence of signals arriving at a modem, the sequence of signals having a first signal at a first frequency and a second signal at a second frequency, the detector comprising:

a first notch filter having an input receiving the sequence of signals and an output;

a first energy calculation circuit having an input connected to the output of the first notch filter and an output;

a second notch filter having an input receiving the sequence of signals and an output;

a second energy calculation circuit having an input connected to the output of the second notch filter and an output; and determining means receiving the output of the first and second energy calculation circuits for determining if one of the first and second signals is present;

wherein the first notch filter has a first cut-off frequency at the first frequency and the second notch filter has a second cut-off frequency at the second frequency.

2. The detector of the frequency shift keyed modulated sequence of signals arriving at the modem according to claim 1, wherein the determining means comprises a comparator, having a first input serially connected to the output of the first energy calculation circuit, a second input serially connected to the output of the second energy calculation circuit, and an output issuing an output signal having a first state indicating that the the first signal at the first frequency is present and a second state indicating that the second signal at the second frequency is present.

3. The detector of the frequency shift keyed modulated sequence of signals arriving at the modem according to claim 2, further comprising:

a modem that stores a predetermined sequence of signals, having an output that provides the predetermined sequence of signals; and detection means, having a first input coupled to the output of the comparator and a second input coupled to the output of the modem, for detecting the predetermined sequence of signals in the frequency shift keyed modulated sequence of signals.

4. The detector of the frequency shift keyed modulated sequence of signals arriving at the modem according to claim 1, wherein each of the first notch filter and the second notch filter is a digital non-recursive filter.

5. The detector of the frequency shift keyed modulated sequence of signals arriving at the modem according to claim 4, wherein each of the first notch filter and the second notch filter is a second order filter with one zero at the first frequency and the second frequency, respectively.

6. The detector of the frequency shift keyed modulated sequence of signals arriving at the modem according to claim 1, wherein the first cut-off frequency is substantially 1850 Hz and the second cut-off frequency is substantially 1650 Hz.

7. An apparatus for detecting at least one signal at one of a first frequency and a second frequency in an input signal, the apparatus comprising:

a first notch filter having an input that receives the input signal and an output that provides a first filtered signal substantially equaling the input signal with a first attenuated portion corresponding to the first frequency;

a first energy determination circuit having an input coupled to the output of the first notch filter and an output that provides a first energy signal that corresponds to an energy value of the first filtered signal;

a second notch filter having an input receiving the input signal and an output that provides a second filtered signal substantially equaling the input signal with a second attenuated portion corresponding to the second frequency;

a second energy determination circuit having an input coupled to the output of the second notch filter and an output that provides a second energy signal that corresponds to an energy value of the second filtered signal; and a comparator having a first input coupled to the output of the first energy determination circuit, a second input coupled to the output of the second energy determination circuit, and an output that provides an output signal based on a comparison of the first energy signal and the second energy signal, the output signal having a first state when the first energy signal is greater than the second energy signal and having a second state when the first energy signal is less than the second energy signal.

8. The apparatus of claim 7, further comprising a detection device having an input coupled to the output of the comparator that receives the output signal of the comparator and an output that provides a detection signal that indicates when the input signal includes a predetermined sequence of signals, the detection signal indicating that the input signal includes the predetermined sequence of signals when the output signal of the comparator includes a predetermined sequence of first and second states.

9. The apparatus of claim 7, wherein:

the first notch filter includes cut-off circuitry that attenuates the input signal so that the first filtered signal substantially equals the input signal with the first attenuated portion that is substantially equal to zero; and the second notch filter includes cut-off circuitry that attenuates the input signal so that the second filtered signal substantially equals the input signal with the second attenuated portion that is substantially equal to zero.

10. The apparatus of claim 7, wherein each of the first notch filter and the second notch filter is a non-recursive digital filter.

11. The apparatus of claim 7, wherein each of the first notch filter and the second notch filter is a non-recursive, second order, digital filter with one zero.

12. The apparatus of claim 7, wherein the first frequency is approximately equal to 1850 Hz and the second frequency is approximately equal to 1650 Hz.

13. The apparatus of claim 8, wherein the detection device further comprises means for storing a stored signal representing the predetermined sequence of first and second states and means for comparing the output signal of the comparator to the stored signal, and wherein the detection signal indicates that the input signal includes the predetermined sequence of signals when the output signal of the comparator is substantially equal to the stored signal.

14. A modem having an input, including:

a circuit, having an input coupled to the input of the modem, that detects at least one signal at one of a first frequency and a second frequency in an input signal arriving at the input of the modem, the circuit including;

a first notch filter having an input that receives the input signal and an output that provides a first filtered signal substantially equaling the input signal with a first attenuated portion corresponding to the first frequency;

a first energy determination circuit having an input coupled to the output of the first notch filter and an output that provides a first energy signal that corresponds to an energy value of the first filtered signal;

a second notch filter having an input that receives the input signal and an output that provides a second filtered signal substantially equaling the input signal with a second attenuated portion corresponding to the second predetermined frequency;

a second energy determination circuit having an input coupled to the output of the second notch filter and an output that provides a second energy signal that corresponds to an energy value of the second filtered signal; and a comparator having a first input coupled to the output of the first energy determination circuit, a second input coupled to the output of the second energy determination circuit, and an output that provides an output signal based on a comparison of the first energy signal and the second energy signal, the output signal having a first state when the first energy signal is greater than the second energy signal and having a second state when the first energy signal is less than the second energy signal.

15. The modem of claim 14, wherein the circuit further includes a detection device, having an input coupled to the output of the comparator that receives the output signal of the comparator and an output that provides a detection signal that indicates when the input signal includes a predetermined sequence of signals, the detection signal indicating that the input signal includes the predetermined sequence of signals when the output signal of the comparator includes a predetermined sequence of first and second states.

16. The modem of claim 14, wherein:

the first notch filter includes cut-off circuitry that attenuates the input signal so that the first filtered signal substantially equals the input signal with the first attenuated portion that is substantially equal to zero; and the second notch filter includes cut-off circuitry that attenuates the input signal so that the second filtered signal substantially equals the input signal with the second attenuated portion that is substantially equal to zero.

17. The modem of claim 14, wherein each of the first notch filter and second notch filter is a non-recursive digital filter.

18. The modem of claim 14, wherein each of the first notch filter and second notch filter is a non-recursive, second order, digital filter with one zero.

19. The modem of claim 14, wherein the first frequency is approximately equal to 1850 Hz and the second frequency is approximately equal to 1650 Hz.

20. The modem of claim 15, further including means, having an input responsive to the detection signal, for switching the modem into a frequency shift keying mode when the detection signal indicates that the input signal includes the predetermined sequence of signals.

21. The modem of claim 15, wherein the detection device further includes means for storing a stored signal representing the predetermined sequence of first and second states and means for comparing the output signal of the comparator to the stored signal, and wherein the detection signal indicates that the input signal includes the predetermined sequence of signals when the output signal of the comparator is substantially equal to the stored signal.

22. A facsimile machine having an input, comprising:
 a circuit, having an input coupled to the input of the facsimile machine, that detects at least one signal at one of a first frequency and a second frequency in an input signal arriving at the input of the facsimile machine, the circuit including;
 a first notch filter having an input that receives the input signal and an output that provides a first filtered signal substantially equaling the input signal with a first attenuated portion corresponding to the first frequency;
 a first energy determination circuit having an input coupled to the output of the first notch filter and an output that provides a first energy signal that corresponds to an energy value of the first filtered signal;
 a second notch filter having an input receiving the input signal and an output that provides a second filtered signal substantially equaling the input signal with a second attenuated portion corresponding to the second predetermined frequency;
 a second energy determination circuit having an input coupled to the output of the second notch filter and an output that provides a second energy signal that corresponds to an energy value of the second filtered signal; and
 a comparator having a first input coupled to the output of the first energy determination circuit, a second input coupled to the output of the second energy determination circuit, and an output that provides an output signal based on a comparison
 of the first energy signal and the second energy signal, the output signal having a first state when the first energy signal is greater than the second energy signal and having a second state when the first energy signal is less than the second energy signal.

23. A method for identifying a predetermined sequence of signals from an input signal, the predetermined sequence of signals including at least one first signal at a first frequency and at least one second signal at a second frequency, the method comprising the steps of:
 (A) filtering the input signal to a produce a first filtered signal substantially equal to the input signal with a first attenuated portion corresponding to the first frequency;
 (B) filtering the input signal to a produce a second filtered signal substantially equal to the input signal with a second attenuated portion corresponding to the second frequency;
 (C) comparing a first energy value of the first filtered signal to a second energy value of the second filtered signal to provide an output signal having a first state when the first energy value is greater than the second energy value and having a second state when the first energy value is less than the second energy value; and
 (D) when the output signal provided by step (C) is a predetermined sequence of first and second states, indicating that the sequence of signals is the predetermined sequence of signals.

24. The method of claim 23, further comprising a step of determining the first energy value of the first filtered signal and a step of determining the second energy value of the second filtered signal.

25. The method of claim 23, further comprising a step of switching a modem into a mode that demodulates frequency shift key modulated transmissions when the output signal is the predetermined sequence of first and second states.

26. The method of claim 23, wherein step (D) includes a step of comparing the output signal to a stored signal representing the predetermined sequence of first and second states.

27. A circuit for identifying a predetermined sequence of signals from an input signal, the predetermined sequence of signals including at least one first signal at a first frequency and at least one second signal at a second frequency, the circuit comprising:
 a first filtering means for providing a first filtered signal of the input signal, the first filtered signal substantially equaling the input signal with a first attenuated portion corresponding to the first frequency;
 a first energy determination circuit having an input receiving the first filtered signal and an output that provides a first energy signal that corresponds to an energy value of the first filtered signal;
 a second filtering means for providing a second filtered signal of the input signal, the second filtered signal substantially equaling the input signal with a second attenuated portion corresponding to the second frequency;
 a second energy determination circuit having an input receiving the second filtered signal and an output that provides a second energy signal that corresponds to an energy value of the second filtered signal; and
 a comparator having a first input coupled to the output of the first energy determination circuit, a second input coupled to the output of the second energy determination circuit, and an output that provides an output signal based on a comparison of the first energy signal and the second energy signal, the output signal having a first state when the first energy signal is greater than the second energy signal and having a second state when the first energy signal is less than the second energy signal.

28. The circuit of claim 27, further comprising detection means, having an input receiving the output signal of the comparator, for detecting the predetermined sequence of signals in the input signal and for providing a detection signal, the detection signal indicating that the input signal includes the predetermined sequence of signals when the output signal of the comparator includes a predetermined sequence of first and second states.

29. The circuit of claim 28, further comprising means for switching a modem into a mode that demodulates frequency shift key modulated transmissions when the output signal is the predetermined sequence of first and second states.

30. The circuit of claim 28, wherein each of the first filtering means and the second filtering means includes a non-recursive digital filter.

31. The circuit of claim 28, wherein each of the first filtering means and the second filtering means includes a non-recursive, second order, digital filter with one zero.

32. The circuit of claim 28, wherein:

the first filtering means includes cut-off means for attenuating the input signal so that the first filtered signal substantially equals the input signal with the first attenuated portion that is substantially equal to zero; and the second filtering means includes cut-off means for attenuating the input signal so that the second filtered signal substantially equals the input signal with the second attenuated portion that is substantially equal to zero.

33. The circuit of claim 29, wherein the detection means includes means for storing a stored signal representing the predetermined sequence of first and second states and means for comparing the output signal of the comparator to the stored signal, and wherein the detection signal indicates that the input signal includes the predetermined sequence of signals when the output signal of the comparator is substantially equal to the stored signal.

* * * * *